(12) United States Patent
Kern et al.

(10) Patent No.: US 7,868,580 B2
(45) Date of Patent: Jan. 11, 2011

(54) METHOD FOR TURNING A THREE-PHASE CURRENT MOTOR ON AGAIN AND ELECTRICAL CIRCUIT FOR IMPLEMENTING THE METHOD

(75) Inventors: Ulrich Kern, Witterschlick (DE); Stefan Pöhler, Waldbüttelbrunn (DE); Hans Otto Seinsch, Garbsen (DE)

(73) Assignee: Atlas Copco Energas GmbH, Cologne (DE)

( * ) Notice: Subject to any disclaimer, the term of this patent is extended or adjusted under 35 U.S.C. 154(b) by 351 days.

(21) Appl. No.: 12/072,897

(22) Filed: Feb. 28, 2008

(65) Prior Publication Data
US 2008/0218117 A1    Sep. 11, 2008

(30) Foreign Application Priority Data
Mar. 9, 2007    (DE) .................. 10 2007 011 510

(51) Int. Cl.
*H02P 1/26* (2006.01)
(52) U.S. Cl. ........................... 318/778; 318/809
(58) Field of Classification Search .............. 318/459, 318/807–810, 812, 558, 778; 361/94–97; 702/57, 58, 64, 72, 75
See application file for complete search history.

(56) References Cited

U.S. PATENT DOCUMENTS

| | | | | |
|---|---|---|---|---|
| 4,465,943 A | * | 8/1984 | Risberg | 307/67 |
| 4,958,117 A | * | 9/1990 | Kerkman et al. | 318/805 |
| 5,635,772 A | | 6/1997 | Lagree et al. | |
| 7,038,423 B2 | * | 5/2006 | Reed et al. | 318/729 |

FOREIGN PATENT DOCUMENTS

| | | |
|---|---|---|
| DE | 41 05 698 | 8/1992 |
| DE | 696 17 165 | 7/2002 |
| DE | 10 2004 010 482 | 9/2005 |

OTHER PUBLICATIONS

Pittius et al., "Über die dynamischen Beanspruchungen in den Wellensträngen grosser Gebläseantriebe bei der Netzumschaltung von Asynchronmaschinen-Gruppen," Archive for Electrical Engineering, vol. 71, 1988, pp. 399-411.

H. O. Seinsch, "Drehmomentbeanspruchungen im Wellenstrang von Asynchronmotoren bei Schnellumschaltungen," Elektrie, Berlin 1992, vol. 46, pp. 456-460.

* cited by examiner

*Primary Examiner*—Bentsu Ro
(74) *Attorney, Agent, or Firm*—Collard & Roe, P.C.

(57) ABSTRACT

A method for turning a three-phase alternating current motor on again, after it has been separated from a supply voltage, if a residual field voltage induced by a rotor residual field is present, and to an electrical circuit for implementing the method. The time progressions of the residual field voltage and the supply voltage are recorded, and the phase difference between the voltages is calculated in advance from the time progressions. A time point $t_s$ is determined, at which the phase difference goes below a predetermined maximum value $\Delta\phi_{max}$. A switching command for applying voltage is triggered at a time interval that corresponds to a predetermined switching time delay $\tau_s$, before the time point $t_s$ is reached, so that the motor is connected to the supply voltage approximately at the time point $t_s$. The electrical circuit has a measurement value detection device, a microcontroller and a direct current setting device.

11 Claims, 1 Drawing Sheet

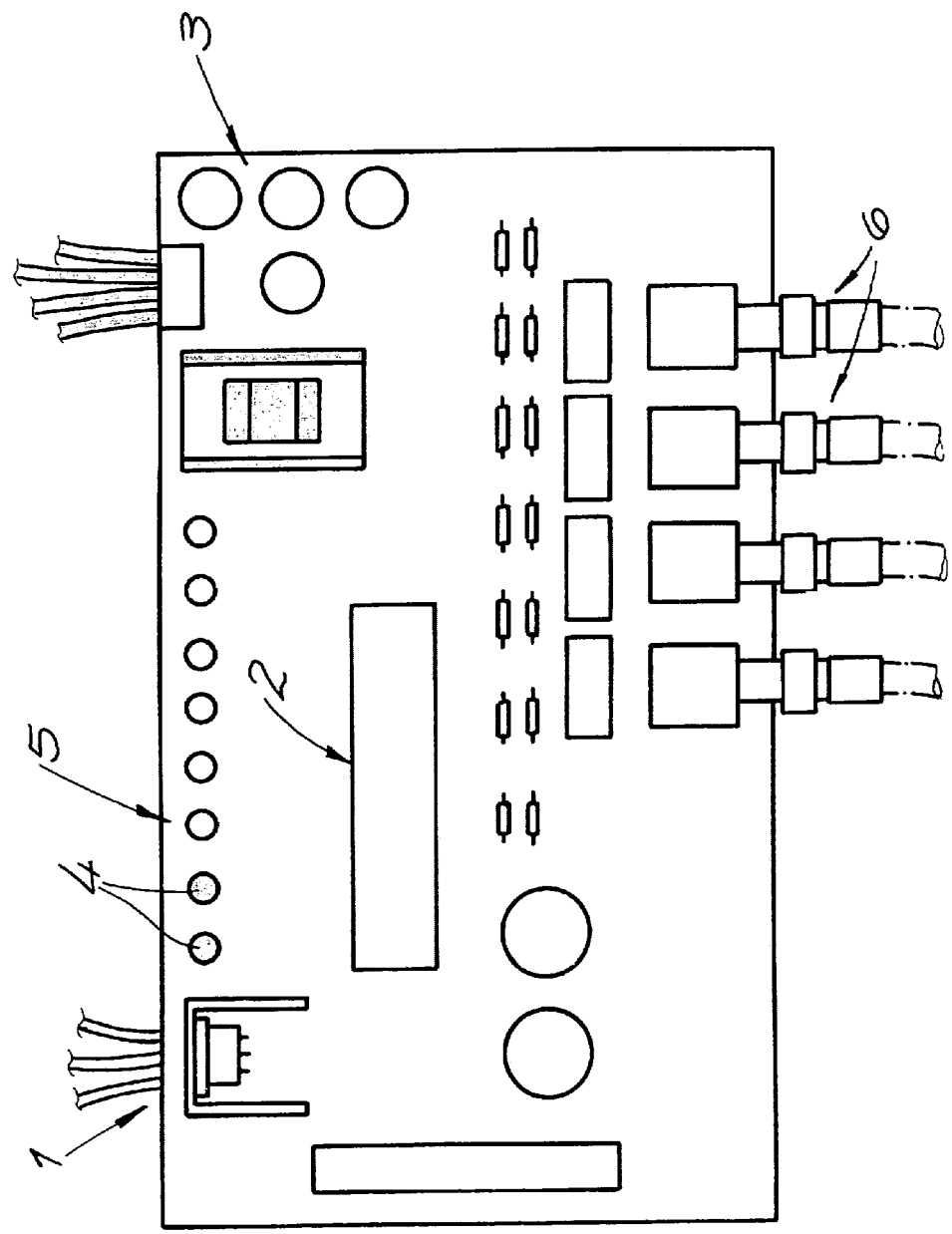

METHOD FOR TURNING A THREE-PHASE CURRENT MOTOR ON AGAIN AND ELECTRICAL CIRCUIT FOR IMPLEMENTING THE METHOD

CROSS REFERENCE TO RELATED APPLICATIONS

Applicants claim priority under 35 U.S.C. 119 of German Application No. 10 2007 011 510.7 filed Mar. 9, 2007.

BACKGROUND OF THE INVENTION

1. Field of the Invention

The invention relates to a method for turning a three-phase alternating current motor (induction motor or synchronous motor) that drives a work machine (e.g. geared turbocompressor) on again, after this motor has been separated from a supply voltage and if a residual field voltage induced by a rotor residual field is present, as well as to an electrical circuit for implementing the method.

2. The Prior Art

Many drives in different applications require the driving three-phase AC motor to be turned on again as quickly as possible and with a low loss in speed of rotation, after an interruption in the supply network has occurred and the motor has been separated from the supply voltage, but at the same time, damage to the motor, to the machine driven by the motor, and all other design parts of the shaft train (clutches, transmissions, etc.) between the machine and the motor must be prevented. In this connection, it must be taken into consideration that the motor keeps running after the motor has been separated from the supply voltage, and a residual field voltage of the speed of rotation frequency is induced by the rotor residual field that is present. Because of the counter-moment of the driven machine, and because of friction, the motor runs down. In the case of three-phase AC motors, after a network failure has occurred, return of the supply voltage with phase oppositions to the residual field voltage represents an extreme stress with regard to the surge currents and surge moments that occur. In particular, in the case of a high mass inertia moment of the work machine, these surge moments introduced on the motor side can bring about extreme rotational vibration stresses in the entire drive train, so that all the components of the drive train, such as motor, clutch, and work machine must be designed to be correspondingly robust and thus super-sized for normal operation. A calculation method for determining the rotational stress that occurs during a network switch is known from the essay "Archiv für Elektrotechnik [Archive for Electrical Engineering] 71, 1988, pages 399 to 411."

In order to avoid super-sizing the components of the drive train or the use of an additional slip clutch, it is known from practice to separate the motor, in the case of disruption in the supply network, by opening a switch, and subsequently to connect it with a reserve network, or with the supply network again, after the disruption has been corrected, in a controlled manner, by closing the switch. As presented in the essay "ELEKTRIE, Berlin 46, 1992, pages 456-460," methods are known for short-time and long-time switching for renewed application of voltage to a three-phase AC motor, if a residual voltage induced by a rotor residual field is present. In order to prevent an excessive torque stress in the drive train in the case of short-time switching, typically within a few milliseconds, the differences between the amplitudes, the frequencies, and the phase shifts of the voltages of a supply network and a reserve network are constantly monitored during operation. Only if all of the differences stay within narrow limits can a switch to the reserve network take place, within a few milliseconds, in case of a disruption of the supply network. If the conditions for short-time switching are not met, long-time switching takes place, waiting until the motor has been braked so far that an excessive torque stress can be precluded when voltage is applied, independent of the phase difference of the supply voltage and the residual field voltage. It is true that the method of long-time switching guarantees moderate surge moments, but it has the disadvantage that the speed of rotation drops so greatly that as a result, the working process is practically interrupted. Finally, in the case of long-time switching, there is also the risk that turning the motor on again takes place at a torsion-critical or bending-critical speed of rotation of the drive train, and great alternating moments occur as a result of the switching process, which endanger the components in the shaft train, or the automatic safety shut-off is actually activated.

SUMMARY OF THE INVENTION

It is therefore an object of the invention to provide a method for turning a three-phase AC motor on again after it has been separated from a supply voltage, if a residual field voltage induced by a rotor residual field is present. This method allows turning the motor on again at any desired residual field voltage, while minimizing the torque stresses.

The invention therefore comprises a method for turning a three-phase AC motor on again, after it has been separated from a supply voltage, if a residual field voltage induced by a rotor residual field is present. The time progressions of the residual field voltage and of the supply voltage are recorded, and the phase difference between the voltages is calculated in advance from the time progressions of the residual field voltage and of the supply voltage. A time point $t_s$ is determined, at which the phase difference goes below a predetermined maximum value $\Delta\phi_{max}$, and a switching command for turning the motor on again is triggered at a time interval that corresponds to a predetermined switching time delay $\tau_s$, before the time point $t_s$ is reached, so that the motor is connected to the supply voltage approximately at the time point $t_s$. By means of the method according to the invention, almost surge-free turning on of the motor after separation from a supply voltage can take place, and the drop in speed of rotation can usually be kept very slight.

While a reserve network must always be kept available in the case of the known short-time switching, and switching can only take place when the amplitudes, the frequencies, and the phases of reserve network and supply network agree, to a great extent. Making the supply voltage available again in accordance with the method according to the invention can take place by means of a reserve network or, after elimination of the disruption, by means of the supply network itself. The invention is particularly based on the recognition that the angular velocity decreases, proceeding from the network frequency of the supply voltage, after the motor has run down after separation from the supply voltage, so that the residual field voltage and the supply voltage are approximately in phase when the motor runs down, at recurring points in time. In this connection, it is possible to determine a time point $t_s$ at which the phase difference goes below a predetermined maximum value $\Delta\phi_{max}$, and a switching command is triggered before the time point $t_s$ is reached, taking the switching time delay $\tau_s$ into consideration, so that voltage is applied approximately at the previously calculated time point $t_s$.

In a preferred embodiment of the method according to the invention, the time points of the zero crossings of the residual field voltage are determined, and the angular velocity and the change in angular velocity of the residual field voltage are determined from the time intervals between the zero crossings. The determination of the zero crossings can be implemented in a particularly simple and reliable manner, from the point of view of measurement technology, for example using an analog comparator, and guarantees the precision required within the scope of the method according to the invention. In this connection, the angular velocity can be determined as the quotient of the phase difference and the time difference between two measurement values, in accordance with $$\omega_i = (\phi_{i+1} - \phi_{i-1})/(t_{i+1} - t_{i-1})$$

For the change in the angular velocity, the following applies analogously:

$$\frac{d\omega_i}{dt} = \frac{(\omega_{i+1} - \omega_{i-1})}{(t_{i+1} - t_{i-1})}.$$

In order to calculate the phase angle $\phi_N$ of the network voltage in advance, several zero crossings can be determined analogously, but usually, the network frequency $f_N$ is known at a high precision, so that the time progression of the phase angle can be determined, proceeding from a zero crossing, according to $$\phi_N(t) = 2\pi \cdot f_N \cdot t \ (2\pi \cdot f_N = \omega_N)$$

The time progression of the phase angle $\phi_R$ of the residual field voltage is obtained, taking into consideration the currently determined angular velocity $\omega_i = \omega_R$ and the determined time change in the angular velocity, according to $$\varphi_R(t) = \omega_R \cdot t + \frac{1}{2} \cdot \frac{d\omega_R}{dt} \cdot t^2.$$

In this connection, t is the time between the next-to-last measurement and switching the power switch on. $\omega_R$ is the circular frequency of the residual field voltage at the time point of the next-to-last measurement, and $d\omega_R/d_t$ is the circular frequency change of the residual field voltage at the time point of the next-to-last measurement. Aside from the time progression of the residual field voltage and the supply voltage, preferably at least the amplitude $A_R$ of the residual field voltage can be determined, and when the amplitude of the residual field voltage drops below a predetermined maximum voltage $A_{max}$, the switching command for applying voltage is triggered independently of the phase relationship between the residual field voltage and the supply voltage. In the case of rapid braking of the three-phase AC motor, in particular, there is the possibility that a speed of rotation of the motor at which the torque stress lies within an acceptable frame, independent of the phase relationship between residual field voltage and supply voltage, is already reached before going below the predetermined phase difference $\Delta\phi_{max}$, as calculated in advance, so that damage to the shaft train can be precluded. Turning the motor on again is usually non-critical, particularly if the torque stresses are less than when starting the three-phase AC motor from a stopped position.

Since the current angular velocity $\omega_R$ of the residual field voltage is determined, to prevent damage, turning the motor on again does not occur in the case of predetermined frequency ranges, for example for frequency ranges in the vicinity of a system-critical speed of rotation of the shaft train, if the phase difference goes below the predetermined maximum value $\Delta\phi_{max}$, or the amplitude $A_R$ of the residual field voltage goes below a predetermined maximum voltage $A_{max}$. As soon as the predetermined frequency range is departed from, when the corresponding prerequisites are met, i.e. the next time the value goes below the predetermined phase difference, or below the predetermined maximum voltage, the three-phase AC motor is turned on again.

Three-phase AC motors, for example for driving turbocompressors, frequently have a power of many kilowatts up to several megawatts, in practice, and are typically configured with three trains. Since the neutral position is generally not accessible in the case of high-voltage motors, the chained voltage (conductor voltage) between two trains is usually measured as the residual field voltage or supply voltage, in each instance, using two measurement transducers, in each instance.

The invention also comprises an electrical circuit for implementing the method according to the invention. The electrical circuit has a measurement value detection device that can be connected with a three-phase AC motor, and with a supply network or a reserve network, to determine time progressions of the phases of a residual field voltage and a supply voltage, a direct current setting device for generating a switching pulse for a power switch, and a microcontroller that allows advance calculation of the phase relationship between the residual field voltage and the supply voltage.

The residual field voltage and the supply voltage typically have amplitudes of several thousand volts, so that the measurement value detection device preferably has probes to be connected to the three-phase AC motor and the supply voltage, which serve as voltage transformers and reduce the measured voltage to a range between −10 volts and +10 volts, for example.

The microcontroller has an analog/digital converter, an analog comparator, multiple timers, and at least one measurement value memory, and is preferably equipped with a standard programming interface for making a connection to a computer or a computer network, so that easy configuration and easy input of default values is possible.

The electrical circuit can also have a status display and/or an interface for output of status reports, so that the status of the electrical circuit and the presence of a disturbance in the supply network can be directly reported to a user. It is also possible that output status messages are captured by a central machine or process control, and processed further.

For renewed application of voltage to the three-phase AC motor after it has been separated from a supply voltage, a power switch is typically provided, which receives a switching pulse from the direct current setting device. In this connection, great switching currents are frequently necessary to trigger the power switch, so that in a preferred embodiment of the electrical circuit, an output of the microcontroller is connected with a field effect transistor (FET), preferably configured as a MOSFET, as a control signal, which transistor connects a separate input voltage with an output side of the direct current setting device.

BRIEF DESCRIPTION OF THE DRAWINGS

Other objects and features of the present invention will become apparent from the following detailed description considered in connection with the accompanying drawing. It is to be understood, however, that the drawing is designed as an illustration only and not as a definition of the limits of the invention.

The single FIGURE shows a circuit board on which the electrical circuit according to the invention is implemented.

DETAILED DESCRIPTION OF THE PREFERRED EMBODIMENT

The electrical circuit for implementing the method according to the invention comprises a measurement value detection device 1, a microcontroller 2, and a direct current setting device 3 for generating a switching pulse for a power switch. The circuit furthermore has eight LEDs 4 as a status display 5, and connectors 6 for programming the microcontroller and for output of status messages.

Measurement value detection device 1 is connected with two terminals of a three-phase AC motor and two terminals of a supply voltage by way of two probes, not shown. The supply voltage is made available by a supply network or by an additional reserve network, which allows operation of the motor in case of failure of the supply network.

Microcontroller 2 has eight digital outputs that are connected with LEDs 4, to display the current status. The first LED 4 is switched on when microcontroller 2 starts, and indicates that the circuit is working. When second LED 4 lights up, the circuit is ready for a network interruption. The third to sixth LEDs 4 indicate the progression of a network interruption after separation of the motor from the supply voltage. The third LED 4 lights up when a network interruption with regard to the supply network exists, and goes out when the supply voltage is made available by a reserve network or by the supply network again. The fourth LED 4 lights up if the zero crossings of the supply voltage or the residual field voltage, respectively, are being recorded by measurement value detection device 1, to determine the time progressions of the phase of the residual field voltage and the supply voltage. If sufficient measurement values have been obtained, the fourth LED 4 goes out and the fifth LED 4 indicates that a suitable precalculated time point $t_s$ for applying voltage is being waited for. As soon as time point $t_s$ has been reached, the sixth LED 4 lights up, while the circuit is reset into its original state. While the seventh LED 4 serves diagnostic purposes during the development of the circuit, the eighth LED indicates when a switching command for the power switch, for turning the motor back on, is being triggered. Since the power switch has a switching delay $\tau_s$ that is known in advance, of typically several tens of milliseconds (e.g. $\tau_s$=60 ms in the case of a power switch type DIL M300 from the company Möller GmbH), the switching command must accordingly be triggered before the time point $t_s$ is reached.

Calculation of time point $t_s$ is based on the detection of the phase position of the residual field voltage at connection terminals of the motor and of the supply voltage. In order to determine the phase position, the zero crossings of the supply voltage and of the residual field voltage of one train, or the chained voltage between two trains, are determined. These voltages can be captured directly, in front of or behind the power switch.

In the case of a disruption of the supply network during operation of the electrical circuit, the power switch is opened, and the network interruption is indicated by the third LED 4. In the case where the supply voltage is again supposed to be made available by the supply network after the power switch has been opened, after the disruption has been eliminated, the duration of the network interruption is first determined. For this purpose, the duration of the network interruption is determined by measurement value detection device 1. After the supply voltage is available again, an analog comparator determines a zero crossing of the supply voltage, and the phase of the supply voltage can be calculated in advance by the determination of this zero crossing, taking the network frequency into consideration. Subsequently, the zero crossings of the residual field voltage are determined, and the angular velocity of the phase and the change in angular velocity are determined from the time intervals between the zero crossings. The time point $t_s$ at which the phase difference goes below a predetermined maximum value $\Delta\phi_{max}$ of 20°, for example, is determined from the data that have been calculated in advance.

Accordingly, while only a few embodiments of the present invention have been shown and described, it is obvious that many changes and modifications may be made thereunto without departing from the spirit and scope of the invention.

What is claimed is:

1. A method for turning a three-phase AC motor on again, after it has been separated from a supply voltage, if a residual field voltage induced by a rotor residual field is present, comprising the following steps:
   recording time progressions of the residual field voltage and of the supply voltage;
   determining time points of zero crossings of the residual field voltage;
   determining angular velocity as well as a change in angular velocity of the residual field voltage from the time intervals between the zero crossings;
   calculating a phase difference between the residual field voltage and the supply voltage in advance from said time progressions;
   determining a time point $t_s$, at which the phase difference goes below a predetermined maximum value $\Delta\phi_{max}$; and
   triggering a switching command for turning the motor on again at a time interval that corresponds to a predetermined switching time delay $\tau_s$, before said time point $t_s$ is reached, so that the motor is connected to the supply voltage approximately at said time point $t_s$.

2. The method according to claim 1, wherein after the motor is separated from the supply voltage, the supply voltage is made available again either by an original network or by a reserve network.

3. The method according to claim 1, wherein the three-phase AC motor is configured in three trains, and wherein each of the time progressions of the residual field voltage and of the supply voltage are obtained with two measurement transducers.

4. The method according to claim 1, wherein the advance calculation of the time progression of the network voltage takes place proceeding from a zero crossing, assuming a constant network frequency, and wherein the advance calculation of the time progression of the residual field voltage takes place proceeding from a zero crossing, taking a current determined angular velocity and a determined time change of the angular velocity into consideration.

5. The method according to claim 1, further comprising the step of determining at least the amplitude of the residual field voltage.

6. The method according to claim 5, wherein when the amplitude of the residual field voltage drops below a predetermined maximum voltage, a switching command for turning the motor on again is triggered independent of a phase relationship between the residual field voltage and the supply voltage.

7. An electrical circuit for turning a three-phase AC motor on again, after it has been separated from a supply voltage, comprising:

a measurement value detection device, which is connected with a three-phase AC motor and with a supply network or a reserve network to determine time progressions of phases of a residual field voltage and a supply voltage;

a direct current setting device for generating a switching pulse for a power switch;

means for determining time points of zero crossings of the residual field voltage; and a microcontroller comprising at least one measurement value memory, wherein said microcontroller allows advance calculation of a phase relationship between the residual field voltage and the supply voltage under consideration of angular velocity as well as a change in angular velocity of the residual field voltage.

8. The electrical circuit according to claim 7, wherein the measurement value detection device has probes connected to the three-phase AC motor and the supply voltage.

9. The electrical circuit according to claim 7, wherein the microcontroller has a standard programming interface for a connection to a computer or a computer network.

10. The electrical circuit according to claim 7, wherein the circuit has a status display or an interface for output of status reports.

11. The electrical circuit according to claim 7, wherein the microcontroller has an analog/digital converter, an analog comparator, timers, and a measurement value memory.

* * * * *